United States Patent
Gekht et al.

(10) Patent No.: US 9,726,040 B2
(45) Date of Patent: Aug. 8, 2017

(54) FLUID DELIVERY SYSTEM FOR A GAS TURBINE ENGINE

(71) Applicant: PRATT & WHITNEY CANADA CORP., Longueuil (CA)

(72) Inventors: Eugene Gekht, Brossard (CA);
Pierre-Yves Legare, Chambly (CA);
Thomas Francis Haslam-Jones, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 320 days.

(21) Appl. No.: 14/670,848

(22) Filed: Mar. 27, 2015

(65) Prior Publication Data

US 2016/0281602 A1    Sep. 29, 2016

(51) Int. Cl.
*F01D 25/18* (2006.01)
*F01D 25/16* (2006.01)
*F16N 7/36* (2006.01)

(52) U.S. Cl.
CPC ........... *F01D 25/18* (2013.01); *F01D 25/164* (2013.01); *F16N 7/363* (2013.01); *F05D 2250/15* (2013.01); *F05D 2260/98* (2013.01)

(58) Field of Classification Search
CPC ........ F01D 25/18; F01D 25/22; F01D 25/164; F01D 25/183; F01D 25/186; F05D 2250/15; F05D 2250/98; F16N 7/26; F16N 7/16; F16N 7/18; F16H 57/045; F16H 57/0409; F16H 57/0457; F16H 57/0427
See application file for complete search history.

(56) References Cited

U.S. PATENT DOCUMENTS

| | | | |
|---|---|---|---|
| 2,911,267 A | 11/1959 | Small, Jr. | |
| 3,637,049 A | 1/1972 | Butterfield et al. | |
| 3,951,476 A | 4/1976 | Schulien et al. | |
| 4,265,334 A | 5/1981 | Benhase, Jr. | |
| 4,342,489 A | 8/1982 | Lenz et al. | |
| 4,429,587 A | 2/1984 | Finn, III et al. | |
| 4,453,784 A | 6/1984 | Kildea et al. | |
| 4,567,784 A | 2/1986 | Hambric | |
| 4,667,774 A | 5/1987 | Roberge | |
| 4,940,115 A | 7/1990 | Sugden | |
| 5,272,868 A | 12/1993 | Ciokajlo et al. | |
| 5,568,984 A | 10/1996 | Williams | |
| 5,794,942 A * | 8/1998 | Vance | F01D 25/04 277/303 |

(Continued)

*Primary Examiner* — Kenneth Bomberg
*Assistant Examiner* — Hoon Choi
(74) *Attorney, Agent, or Firm* — Norton Rose Fulbright Canada LLP

(57) ABSTRACT

A fluid delivery assembly for delivering fluid to a component in a gas turbine engine includes a rotating shaft having a central bore and at least one fluid exhaust in communication with the central bore for centrifugally expelling fluid, and a delivery scoop disposed around the rotating shaft and spaced apart from the rotating shaft by an annular gap. The delivery scoop includes an annular body having at least one impingement surface facing the at least one fluid exhaust and configured to scoop the fluid expelled by the at least one fluid exhaust. The impingement surface has at least one outlet for delivering the scooped fluid to the component. A method of delivering pressurised fluid in a fluid system is also presented.

20 Claims, 4 Drawing Sheets

(56) References Cited

U.S. PATENT DOCUMENTS

| | | |
|---|---|---|
| 6,682,222 B2 | 1/2004 | Fisher |
| 6,903,470 B2 * | 6/2005 | Doherty ............... H02K 11/042 |
| | | 310/59 |
| 7,455,150 B1 | 11/2008 | Gekht et al. |
| 8,201,663 B2 * | 6/2012 | Munson ................ F01D 25/183 |
| | | 184/11.2 |
| 8,464,835 B2 | 6/2013 | Munson |
| 8,857,149 B1 | 10/2014 | Muldoon |
| 2010/0038173 A1 | 2/2010 | Munson |

* cited by examiner

FLUID DELIVERY SYSTEM FOR A GAS TURBINE ENGINE

TECHNICAL FIELD

The application relates generally to gas turbine engines and, more particularly, to fluid delivery systems.

BACKGROUND

Various parts of gas turbine engines are lubricated using a stream of lubricant fluid. The fluid has to be routed up to the very location where the lubrication or feeding is needed. For example, when feeding bearing gaps, also known as bearing dampers, a complex routing of dedicated oil feed line through the gaspath may be needed to reach the delivery point. Besides the complexity of the routing, and its associated weight, the oil feed line is disposed in the gaspath, which may bring the oil at relatively high temperatures and which may in turn cause coking.

SUMMARY

In one aspect, there is provided an oil scoop to be disposed around a rotating shaft of a gas turbine engine and adapted to receive centrifugally expelled fluid from the rotating shaft, the delivery scoop comprising: an annular body having a generally U-shape cross-section, an inner surface of the annular body including a plurality of circumferentially disposed impingement surfaces circumferentially separated by a plurality of vanes extending radially inwardly from the annular body, a plurality of independent fluid channels being defined by adjacent vanes and the impingement surfaces disposed between the adjacent vanes, the independent fluid channels having corresponding slot outlets defined in an axial end wall of the annular body, the axial end wall closing otherwise the independent fluid channels.

In another aspect, there is provided a fluid delivery assembly for delivering fluid to a component in a gas turbine engine, the fluid delivery assembly comprising: a rotating shaft having a central bore and at least one fluid exhaust in communication with the central bore for centrifugally expelling fluid; and a delivery scoop disposed around the rotating shaft and spaced apart from the rotating shaft by an annular gap, the delivery scoop including an annular body having at least one impingement surface facing the at least one fluid exhaust and configured to scoop the fluid expelled by the at least one fluid exhaust, the impingement surface having at least one outlet for delivering the scooped fluid to the component.

In yet another aspect, there is provided a method of delivering pressurised fluid in a fluid system, the method comprising: centrifugally expelling fluid from a central bore of a rotating shaft; scooping the fluid with a delivery scoop located about the rotating shaft such that the fluid conserves at least partially its kinetic energy; and directing the fluid with its kinetic energy to a component adjacent to an outlet of the delivery scoop.

DESCRIPTION OF THE DRAWINGS

Reference is now made to the accompanying figures in which.

DETAILED DESCRIPTION

Figure 1:
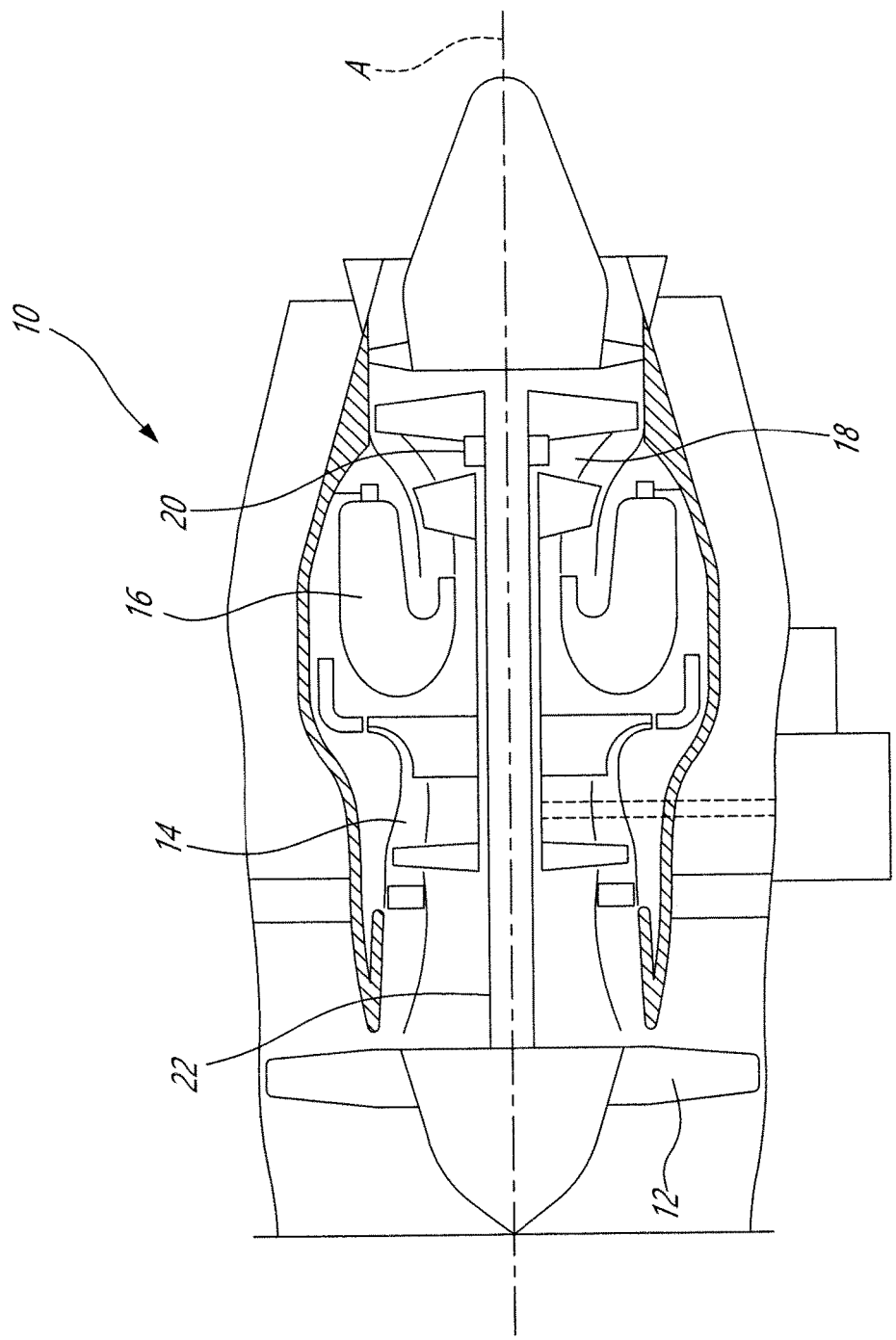
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The engine 10 includes at least one bearing 20 disposed around a shaft 22. The bearing 20 is here shown around the power shaft 22 of the engine 10 for illustration purposes, but it is contemplated that the bearing 20 could be disposed around any other rotating shaft of the engine 10.

Figure 2:
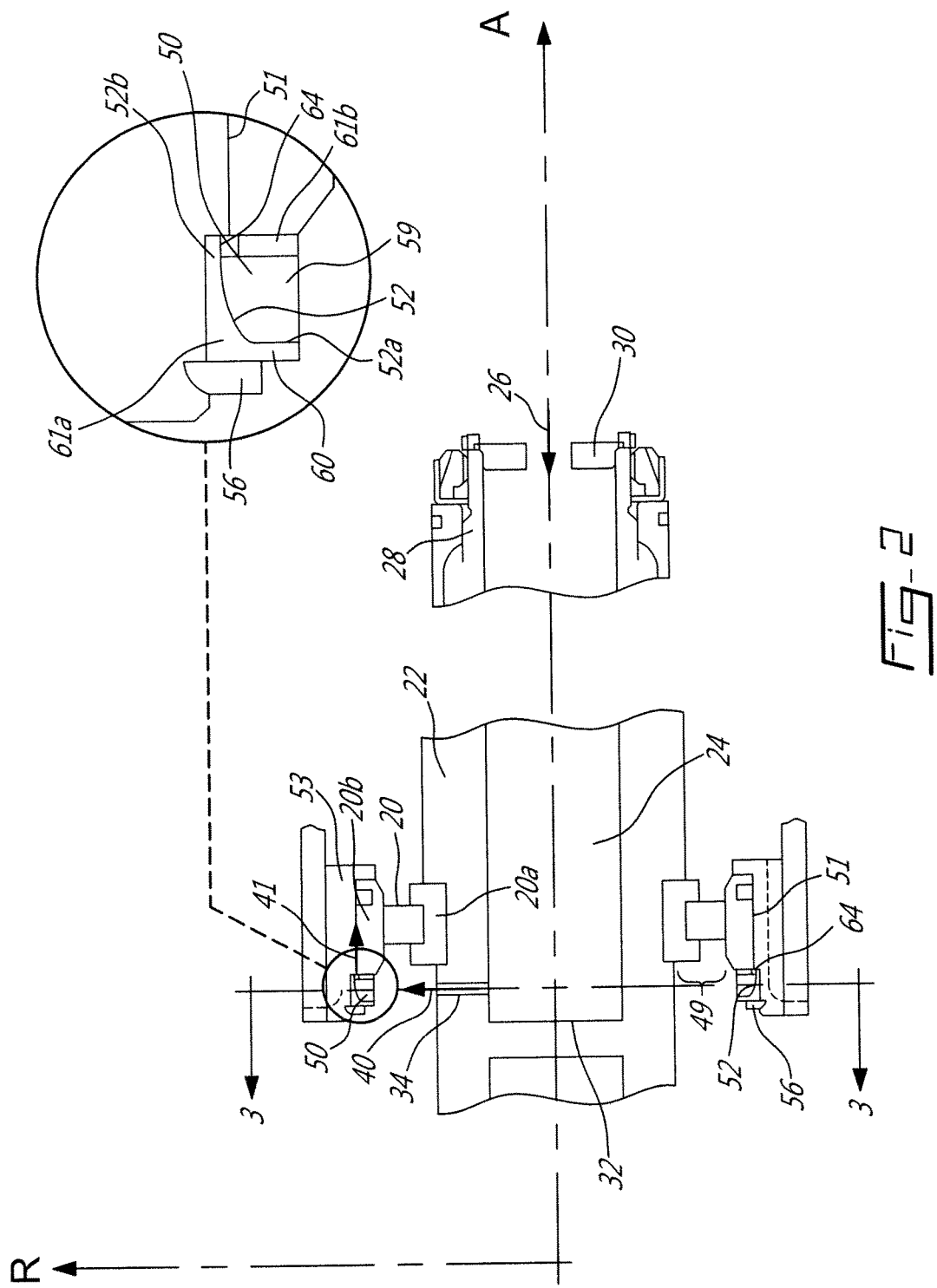
FIG. 2 is a schematic cross-sectional view of a shaft, bearing and associated bearing damper fluid delivery system.
Figure 3:
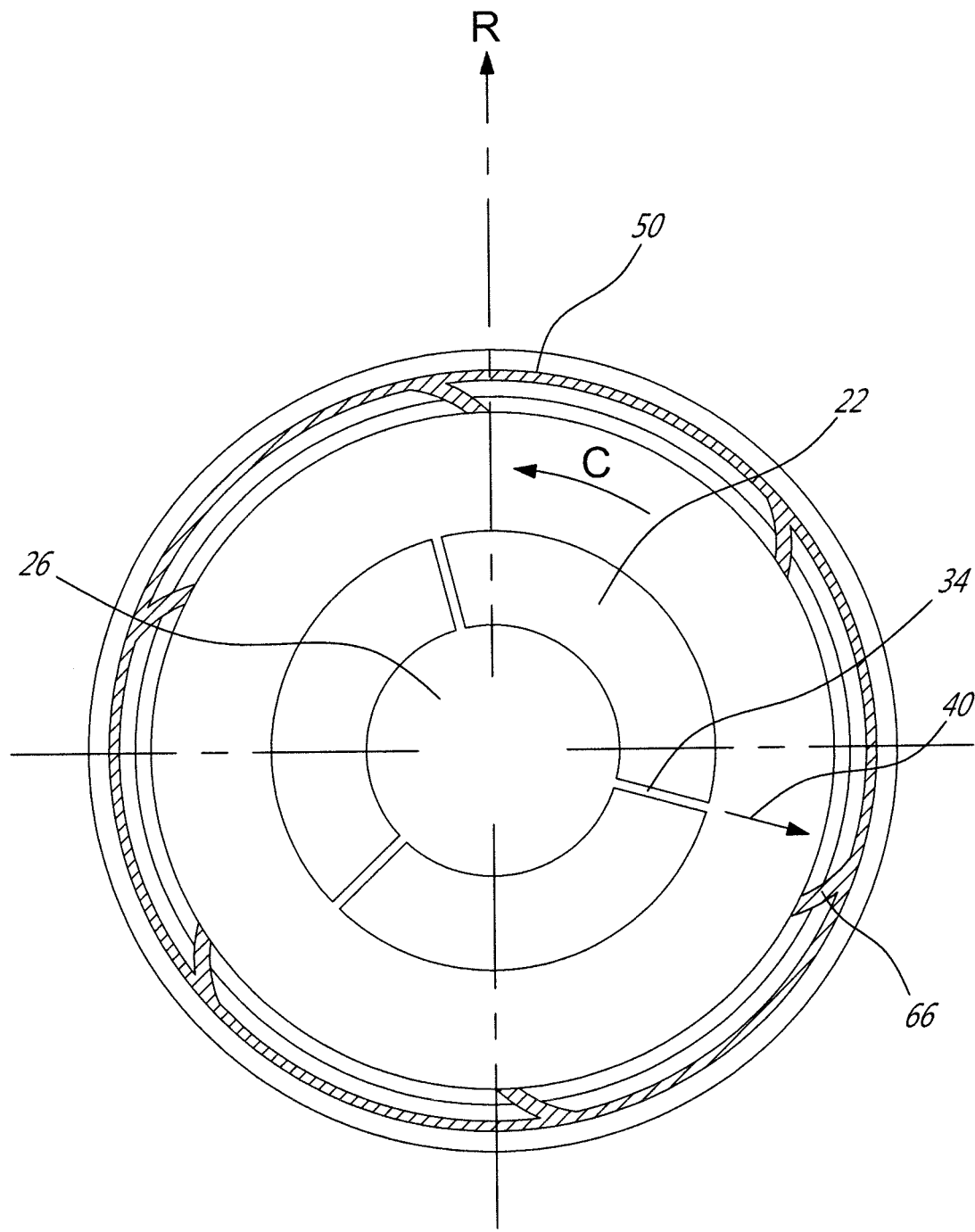
FIG. 3 is a schematic cross-sectional view of the shaft, bearing and associated bearing damper fluid delivery system taken along line 3-3 in FIG. 2.

Turning to FIG. 2, the shaft 22 defines an axial direction A and a radial direction R. The shaft 22 is hollow and includes a central bore 24. The central bore 24 is adapted to receive a flow of fluid, e.g. lubricant, illustrated by arrow 26. An end 28 of the bore 24 may include a dam 30 to prevent or reduce back flow of the fluid. Another end 32 of the bore 24 may be closed. The shaft 22 includes a plurality of fluid exhaust or nozzles 34 distributed circumferentially (circumferential direction C shown in FIG. 3) and in communication with the central bore 24. In this example, the shaft 22 includes three nozzles 34, but it is contemplated that the shaft 22 could include any number of nozzles 34 that is one or more. A number of nozzles 34 may be selected in accordance with a flow rate of fluid to carry. The nozzles 34 extend through the shaft 22, bringing in fluid communication the bore 24 with an outside of the shaft 22. The nozzles 34 may be simply shaped as cylindrical openings in the shaft 22. The nozzles 34 deviate a portion of the fluid from the bore 24 to the outside of the shaft 22. When the shaft 22 rotates, centrifugal forces tend to dispose the oil 26 towards walls of the bore 24, and as a result to flow through the nozzles 34, as illustrated by arrow 40. Given the radial orientation of the nozzles 34, the flow of oil exiting the nozzles 34 is, in the illustrated embodiment, radial. In this example, the nozzles 34 are equidistantly circumferentially disposed (as best shown in FIG. 3), although the spacing between the nozzles 34 may be other than equidistant. In the embodiment shown in the figures, the nozzles 34 are radially oriented, meaning that they are perpendicular relative to the shaft 22. It is however contemplated that the nozzles 34 could be at an angle in axial and/or circumferential direction other than 90 degrees relative to the shaft 22. For example, the nozzles 34 could be at 110 degrees or 80 degrees relative to the shaft 22 depending on the desired fluid path. The nozzles 34 are shown herein to be straight, but it is contemplated that the nozzles 34 could be curved, and have varying diameter, so as to deliver oil in a desired trajectory based on the fluid delivery target.

A delivery scoop 50 (also known as an oil scoop) is disposed around the shaft 22 and in alignment with the nozzles 34. The delivery scoop 50 is configured to recover oil jet momentum from the oil expelled from the nozzles 34, and deliver the oil to a feature that need pressurized oil, such as a reservoir of a bearing damper. The delivery scoop 50 is designed to scoop or channel the fluid, thereby conserving at least partially a kinetic energy of the oil. In one embodiment, delivery scoop 50 also assists in converting the oil's kinetic energy into static pressure, by enabling the delivery of pressurized oil to a target having a closed cavity (e.g. bearing damper), in such a way that oil pressure builds up at the target. In one embodiment, the delivery scoop 50 redirects (i.e. changes a direction of) the jet of pressurised oil 40 to the target. In the particular embodiment shown in the figures, the delivery scoop 50 redirects the radial jet 40 of fluid to a generally axial direction (see arrow 41) toward an axially elongated bearing gap, or damper, 51 disposed between the bearing 20 and a bearing support 53. It is contemplated that various orientations and fluid delivery targets could be associated with the delivery scoop 50. To redirect the jet of oil 40, the delivery scoop 50 includes one or more impingement surface(s) 52 whose shape determines a deviation of the jet of pressurised oil 40 from its trajectory.

In one embodiment, the delivery scoop 50 is connected to the bearing support 53 at support outer race 20*b* of the bearing 20, the shaft 22 being connected to an inner race 20*a* of the bearing 20. An annular radial gap 49 is defined by a free space between the shaft 22 and the delivery scoop 50 and spans at least a portion of the bearing 20. A retaining ring 56 ensures a tight fit between the delivery scoop 50 and the outer race 20*b*. It is contemplated that the delivery scoop 50 could be secured to the outer race 20*b* and/or bearing support 53 by other ways than a tight fit or abutment. For example, it could be fastened to the outer race 20*b* and/or bearing support 53. The delivery scoop 50 could also be connected to a static portion of the engine 10, other than the bearing 20 and/or bearing support 53. It is also contemplated that the delivery scoop 50 could be connected to a rotating portion of the gas turbine engine 10. For example, should the outer race 20*b* of the bearing 20 be rotating (for example, an inter-shaft bearing which is not the case in the illustrated example), the delivery scoop 50 would be rotating. The delivery scoop 50 could be rotating in a direction of rotation of the shaft 22 or in a direction opposite to a rotation of the shaft 22.

Figure 4:
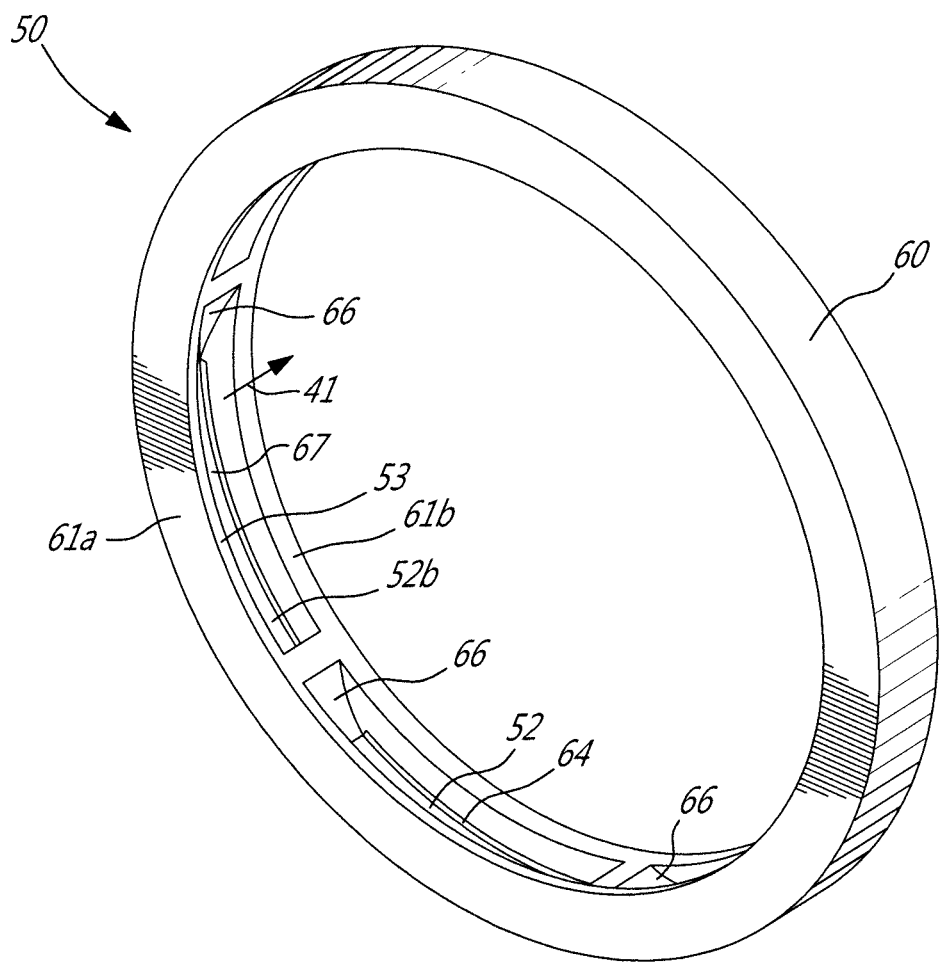
FIG. 4 is a schematic perspective view of a scoop for the damper fluid delivery system.

Referring additionally to FIG. 4, the delivery scoop 50 includes an annular or body 60 having a generally U-shaped cross-sectional shape. In one embodiment, the annular body 60 is made of metal or a composite. The annular body 60 has a general U-shaped cross-section formed by a generally L-shaped annular wall 61*a* at one axial end, and a facing annular end wall 61*b* at another axial end. A radial inner end 59 of the annular body 60 is open to reveal the impingement surface 52 of the generally L-shaped wall 61*a*. The impingement surface 52 extends circumferentially, and is shaped and oriented such that the jet 40 of oil impacting it is redirected axially (see arrow 41). In one embodiment, the impingement surface 52 is curved, or may have any other shape so as to direct oil to its desired destination, with other cross-sectional profiles being considered including a sloped cross-sectional profile, a parabolic profile, etc. Having a curved impingement surface 52 may minimize kinetic energy loss. The impingement surface 52 includes a first end 52*a* generally radially aligned and a second end 52*b* at an angle relative to the first end 52*a*. In one embodiment, the second end 52*b* is generally axially aligned.

The annular body 60 may include outlets in the shape of a plurality of arcuate slots 64 formed in the end wall 61*b* of the annular body 60. The slots 64 are adjacent to the second end 52*b* of the impingement surface 52, and are adjacent to the damper 51. The redirected axial jet 41 exits the delivery scoop 50 via a plurality of slots 64 into the damper 51. It is contemplated that the plurality of slots 64 and the end wall 61*b* could be omitted. It is also contemplated that the slots 64 could be flat, or be shaped as openings (e.g. round openings). It could also be one continuous circumferential slot.

The delivery scoop 50 may include a plurality of radially inwardly (i.e. toward the shaft 22) extending curved walls, or vanes 66 creating fluidly independent channels 67. The vanes 66 fraction the impingement surface 52 into a plurality of impingement surfaces 53, each associated with one of the slots 64. The channels 67 are defined by the fractionned impingement surfaces 53 and their associated adjacent vanes 66. The slots 64 are outlets of the channels 67. The vanes 66 are axially aligned with the nozzles 34. The vanes 66 may be angled to help redirect the radial jet 40 of oil toward the slots 64, as the shaft 22 and the nozzles 34 rotate, and thereby keeping the jet 40 pressurized. In the example shown in the figures, the delivery scoop 50 includes six vanes 66, but it is contemplated that the delivery scoop 50 could include more or less than six vanes 66. The delivery scoop 50 could also have no vanes, in cases for example where pressurization of the oil may not be a constraint. The number of vanes 66 may vary as a function of a number of rotating nozzles 34 and targeted oil pressure.

The delivery scoop described above may allow delivering pressurized oil from a rotating shaft cavity to axially oriented elements, such as bearing dampers. Bearing dampers are conventionally dead-ended and form a receptacle for oil, whereby the delivery scoop may assist in building a static oil pressure in the damper bearing. A similar approach may be used with other components which are also dead-ended, or with throat portions limiting the exit of oil. The scoop may also be shaped to redirect to directions other than axially. The scoop may be configured to recover oil jet momentum and deliver oil axially into dampers or any other features that need pressurized oil. The above described scoop may avoid complex fluid paths to reach the delivery point, and may be retrofitted in existing shafts and bearing assemblies. In one embodiment, the scoop may take advantage of existing under race bearing oil feed system to also feed the bearing damper, thus eliminating the external oil feed line. The delivery scoop may be stationary as shown in the figures or placed on a counter-rotating or co-rotating shaft surrounding the shaft having the fluid exhaust.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. An oil scoop to be disposed around a rotating shaft of a gas turbine engine and adapted to receive centrifugally expelled fluid from the rotating shaft, the delivery scoop comprising:

an annular body having a generally U-shape cross-section, an inner surface of the annular body including a plurality of circumferentially disposed impingement surfaces circumferentially separated by a plurality of vanes extending radially inwardly from the annular body, a plurality of independent fluid channels being defined by adjacent vanes and the impingement surfaces disposed between the adjacent vanes, the independent fluid channels having corresponding slot outlets defined in an axial end wall of the annular body, the axial end wall closing otherwise the independent fluid channels.

2. The oil scoop of claim 1, wherein each of the slot outlets is arcuate.

3. The oil scoop of claim 1, wherein the at least one impingement surface has a cross-sectional profile being curved axially.

4. A fluid delivery assembly for delivering fluid to a component in a gas turbine engine, the fluid delivery assembly comprising:

a rotating shaft having a central bore and at least one fluid exhaust in communication with the central bore for centrifugally expelling fluid; and a delivery scoop disposed around the rotating shaft and spaced apart from the rotating shaft by an annular gap, the delivery scoop including an annular body having at least one impingement surface facing the at least one fluid exhaust and configured to scoop the fluid expelled by the at least one fluid exhaust, the impingement surface having at least one outlet for delivering the scooped fluid to the component.

5. The fluid delivery assembly of claim 4, wherein the at least one impingement surface is configured to redirect the fluid expelled by the at least one fluid exhaust.

6. The fluid delivery assembly of claim 4, wherein the at least one fluid exhaust is at least one nozzle.

7. The fluid delivery assembly of claim 4, wherein a motion of the delivery scoop is independent from a rotation of the shaft.

8. The fluid delivery assembly of claim 4, wherein the delivery scoop is static relative to the rotating shaft.

9. The fluid delivery assembly of claim 4, wherein the at least one impingement surface has a cross-sectional profile being curved axially.

10. The fluid delivery assembly of claim 4, wherein the at least one outlet includes at least one arcuate slot.

11. The fluid delivery assembly of claim 4, further comprising at least one vane extending inwardly radially from the annular body of the delivery scoop.

12. The fluid delivery assembly of claim 4, wherein the at least one impingement surface includes a plurality of impingement surfaces, and the at least one outlet includes a plurality of outlets, the plurality of outlets being associated with the plurality of impingement surfaces, and further comprising a plurality of vanes extending inwardly radially from the annular body, the plurality of vanes separating circumferentially each set of impingement surface and associated outlet.

13. The fluid delivery assembly of claim 4, wherein the delivery scoop is connected to an outer race of a bearing and the rotating shaft is connected to an inner race of the bearing.

14. The fluid delivery assembly of claim 4, wherein the at least one fluid exhaust includes a plurality of fluid exhaust circumferentially distributed about the rotating shaft.

15. The fluid delivery assembly of claim 4, wherein the fluid expelled by the at least one fluid exhaust is a lubricant.

16. A method of delivering pressurised fluid in a fluid system, the method comprising:

centrifugally expelling fluid from a central bore of a rotating shaft;

scooping the fluid with a delivery scoop located about the rotating shaft such that the fluid conserves at least partially its kinetic energy; and directing the fluid with its kinetic energy to a component adjacent to an outlet of the delivery scoop.

17. The method of claim 16, wherein scooping the fluid comprises directing the fluid away from a direction of the fluid expelled centrifugally from the rotating shaft.

18. The method of claim 16, further comprising delivering the fluid expelled from the outlets of the delivery scoop to a closed cavity to convert the fluid's kinetic energy into static pressure.

19. The method of claim 16, wherein scooping the fluid comprises flowing the fluid expelled from the rotating shaft on a plurality of fluidly independent channels of the delivery scoop.

20. The method of claim 16, wherein expelling the fluid from the delivery scoop comprises expelling the fluid through slots of the delivery scoop.

* * * * *